US010713489B2

(12) United States Patent
Ravi et al.

(10) Patent No.: US 10,713,489 B2
(45) Date of Patent: Jul. 14, 2020

(54) AUGMENTED REALITY FOR IDENTIFICATION AND GROUPING OF ENTITIES IN SOCIAL NETWORKS

(71) Applicant: Microsoft Technology Licensing, LLC, Redmond, WA (US)

(72) Inventors: Sandeep Ravi, Redmond, WA (US); Jorge Erick Santoyo Garduno, Seattle, WA (US); Sreevani Tippana, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 326 days.

(21) Appl. No.: 15/792,387

(22) Filed: Oct. 24, 2017

(65) Prior Publication Data

US 2019/0122045 A1    Apr. 25, 2019

(51) Int. Cl.
*G06K 9/00* (2006.01)
*H04L 29/08* (2006.01)
*H04L 12/58* (2006.01)

(52) U.S. Cl.
CPC ..... *G06K 9/00671* (2013.01); *G06K 9/00228* (2013.01); *G06K 9/00288* (2013.01); *H04L 67/306* (2013.01); *G06K 2209/21* (2013.01); *H04L 51/32* (2013.01)

(58) Field of Classification Search
None
See application file for complete search history.

(56) References Cited

U.S. PATENT DOCUMENTS

| 8,917,913 B2 | 12/2014 | Kritt et al. |
| 2009/0003662 A1 | 1/2009 | Joseph et al. |
| 2011/0169932 A1 | 7/2011 | Mula et al. |

(Continued)

FOREIGN PATENT DOCUMENTS

WO    2014036052 A1    3/2014

OTHER PUBLICATIONS

"International Search Report and Written Opinion Issued in PCT Application No. PCT/US2018/049818", dated Nov. 27, 2018, 13 Pages.

(Continued)

*Primary Examiner* — Fayyaz Alam
(74) *Attorney, Agent, or Firm* — NovoTechIP International PLLC

(57) ABSTRACT

In non-limiting examples of the present disclosure, systems, methods and devices for identifying and presenting information of a target user are presented. A live video stream comprising a target user may be displayed on a display of an augmented reality computing device. Data associated with one or more images of the target user may be sent to a facial recognition service, which may determine that a social network account matches the target user based on facial feature recognition. Information associated with the matched social network account may be received, and the live video stream on the augmented reality computing device may be augmented with a display of the received information associated with the matched social network account. In some examples, the augmented reality computing device may be augmented with one or more social network actions that are executable based on matching a target user to a social network account.

20 Claims, 9 Drawing Sheets

(56) References Cited

U.S. PATENT DOCUMENTS

| | | |
|---|---|---|
| 2011/0221656 A1* | 9/2011 | Haddick .............. G02B 27/017 345/8 |
| 2013/0287269 A1 | 10/2013 | Gossweiler et al. |
| 2014/0111542 A1* | 4/2014 | Wan ........................ G06F 3/147 345/633 |
| 2014/0368538 A1 | 12/2014 | Ratcliff et al. |
| 2015/0012426 A1* | 1/2015 | Purves ............... G06Q 30/0623 705/41 |
| 2015/0169946 A1 | 6/2015 | Needleman |
| 2015/0279117 A1* | 10/2015 | Schimke ................ G06F 16/00 345/633 |
| 2016/0055371 A1 | 2/2016 | Wu et al. |
| 2016/0267674 A1 | 9/2016 | Barak et al. |
| 2019/0035153 A1* | 1/2019 | Dange .................. G06T 19/006 |

OTHER PUBLICATIONS

Dantone, et al., "Augmented Faces", In Proceedings of IEEE International Conference on Computer Vision Workshops, Nov. 6, 2011, 8 Pages.

Kurze, et al., "Smart glasses linking real live and social network's contacts by face recognition", In Proceedings of 2nd Augmented Human International Conference, Mar. 13, 2011, 2 Pages.

Parsons, Jeff, "Augmented reality app lets you scan people's FACES and reveal everything about them", Retrieved from: <<http://www.mirror.co.uk/tech/augmented-reality-app-lets-you-9396988>>, Dec. 6, 2016, 8 Pages.

* cited by examiner

AUGMENTED REALITY FOR IDENTIFICATION AND GROUPING OF ENTITIES IN SOCIAL NETWORKS

BACKGROUND

Social networking computer services allow users to connect with a wide circle of other users, such as acquaintances, friends, peers, colleagues, and the like, while also providing the ability to locate information about those connections through their social network profiles. This functionality can be useful to social network users wanting to know more about their connections, but it requires that a user have sufficient time to navigate to a social network homepage, perform a search for a connection of interest, and sort through one or more social network account pages to locate the specific information that the user is searching for. Additionally, if a user of a social network would like to create a group on the social network that includes one or more of their connections, they must create a group name on the social network, identify connections that should be invited to the group, and manually generate any additional information about the group that they would like included with the group description. The time and effort required to perform such actions on social networks makes performing those actions difficult when users are short on time. For example, when users are meeting their connections in person, it is often too difficult, distracting and/or time consuming to identify information about their connections while meeting in a group setting.

It is with respect to this general technical environment that aspects of the present technology disclosed herein have been contemplated. Furthermore, although a general environment has been discussed, it should be understood that the examples described herein should not be limited to the general environment identified in the background.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter. Additional aspects, features, and/or advantages of examples will be set forth in part in the description which follows and, in part, will be apparent from the description or may be learned by practice of the disclosure.

Non-limiting examples of the present disclosure describe systems, methods and devices for identifying and presenting information of a target user of a social networking computer service utilizing an augmented reality computing device (an "AR computing device"). A user of an AR computing device, such as a smart phone, a tablet, smart eyeglasses, head-up display devices, computer-integrated contact lenses, and more generally, computing devices that include a camera, a display, and device location detection components, thereby making such a devices suitable augmented reality platforms, may utilize that AR computing device in an in-person setting to identify one or more target users of a social network that the AR computing device user is connected or otherwise associated with via the social network.

Thus, in examples, an AR user may utilize an AR computing device to capture one or more images of a person that the user is in physical proximity with. The one or more images and/or data associated with those one or more images, may be sent to a social networking service, which may then utilize facial recognition technology to determine an account user of the social networking service that corresponds to the person whose images it has received. The social networking service may send information associated with the identified, or matched, social network account to the AR computing device, and a live video stream on a display of the AR computing device may be augmented with information from the matched social network account in association with the person whose images were captured and sent to the social networking service for identification.

In additional examples, an AR computing device user may capture images of first and second persons with an AR computing device, and in addition to identifying social network service accounts associated with those persons, and augmenting a live video stream with information from those respective social network service accounts, the systems, methods and device described herein may provide for the presentation of, in the augmented live video stream, at least one social networking action that can be executed on the social network based on identification of the matched social network service accounts. In some examples, the live video feed on the AR computing device may be augmented with an option to create a group on the social network service that includes the first and second persons that the images were captured of, as well as a user associated with the AR device (e.g., an owner of the AR device, a user of the AR device with an account of the social network service associated with it, etc.). In additional examples, in augmenting the live video feed with an option to create a social network group, the augmentation may also include a proposed name for the group based on, for example, shared interests amongst the social network service users, contextual information that may apply to one or more communications exchanged amongst one or more of the social network service users, and contextual information common to a plurality of the social network service users determined from one or more applications or services such as calendar applications, notes applications, etc.

BRIEF DESCRIPTION OF THE DRAWINGS

Non-limiting and non-exhaustive examples are described with reference to the following figures.

DETAILED DESCRIPTION

Figure 1:
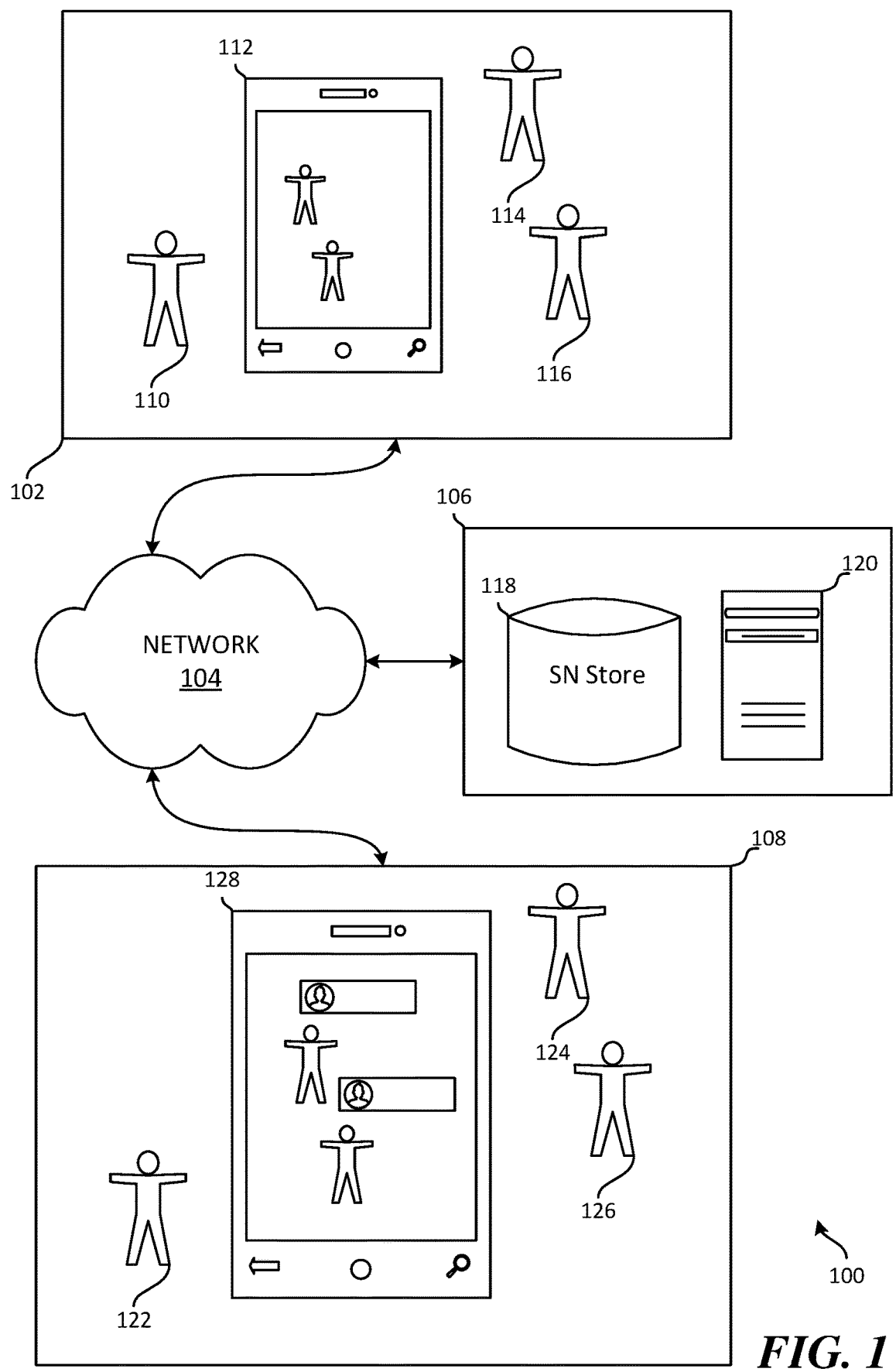
FIG. 1 is a schematic diagram illustrating an example distributed computing environment for augmenting a live video feed on an augmented reality computing device, with social network account information of a target user.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

The various embodiments and examples described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the claims.

Generally, the present disclosure is directed to systems, methods and devices for identifying and presenting information of a target user of a social networking computer service utilizing an augmented reality computing device. As used herein, an augmented reality computing device (sometimes referred to herein as "AR device" or "AR computing device") may comprise computing devices such as smart phones, tablets, computer-integrated eyeglasses, head-up display devices, computer-integrated contact lenses, and more generally, computing devices that include a camera, a display, and device location detection components, thereby making them suitable augmented reality platforms.

In examples, a camera in communication with an augmented reality computing device may be utilized to capture one or more images and/or videos of a person or persons associated with a social networking service. The one or more captured images and/or videos may be matched, using facial recognition techniques, against social network account profiles to do determine whether one or more facial identification values from an account profile match one or more facial identification values associated with the captured images.

In some examples, the social network service may perform the facial recognition matching of received images or videos. In other examples, a cloud-based facial recognition service may perform the facial recognition matching of received images or videos. Thus, in some aspects, a cloud-based facial recognition service may communicate with a social network service and determine whether one or more uploaded images or videos associated with one or more social network accounts match one or more uploaded images or videos received from an AR computing device. In still other examples, an AR computing device may perform the facial recognition matching of received images or videos. That is, in some aspects, an AR computing device may communicate with a social network service and the AR computing device may determine whether one or more uploaded images or videos associated with one or more social network accounts match one or more images or videos taken by the AR computing device.

According to some aspects, a facial recognition system utilizing geometric algorithms may be implemented by a social network service, a cloud-based facial recognition service and/or an AR computing device, in order to determine baseline geometric values to assign to distinguishing facial features of a social network service user based on their uploaded images. In other examples, the social network service, the cloud-based facial recognition service and/or the AR computing device, may utilize photometric algorithms in order to distill one or more uploaded images of a social network user into values, and those values may then be trained on additional image data and templates to eliminate variances and arrive at baseline photometric values for the social network user. The facial recognition system implemented by the social network, the cloud-based facial recognition service and/or the AR computing device, may utilize various algorithms in determining baseline values to assign to a user, such as one or more of: principal component analysis using eigenfaces, linear discriminant analysis, elastic bunch graph matching using the Fisherface algorithm, the hidden Markov model, multilinear subspace learning using tensor representation, and the neuronal motivated dynamic link matching, for example.

Thus, one or more images and/or videos uploaded to an account profile of a social network for a user may be received by a facial recognition system, which may analyze that content and determine whether it includes enough data to make value determinations for one or more facial features, such as the relative position, size and/or shape of the eyes, nose, cheekbones, jaw, and/or facial skin coloration and defining markings. In some examples, the facial recognition system employed by the social network service may assign a value to each analyzed facial feature based on a plurality of images of the user on the social network. In examples where a plurality of images of a social network user are analyzed, a baseline value may be assigned to each analyzed facial feature based on various techniques, such as one or more of: calculating mean and median values for facial features that differ amongst a plurality of images for a user, normalizing values associated with a plurality of images for a user, and removing outlier facial feature values by training the system on a user's uploaded images and one or more template models.

Upon receiving one or more uploaded images of a person or persons from an AR computing device, a determination may be made as to whether one or more of those uploaded images can be matched to one or more user accounts associated with a social network. For example, utilizing the same or similar mechanisms as discussed above with regard to calculating baseline values for images of users on a social network, the facial recognition system may determine facial feature values for the images received from the AR device, and further determine whether one or more of those facial feature values, and/or a derivative of those values based on further calculation, are within an identification threshold value of one or more baseline values determined based on facial recognition analysis applied to other social network account/profile images of the user. In some examples, in addition or alternative to matching uploaded facial images and/or videos of target users to one or more social network accounts, the systems, methods and devices described herein may match other identifying criteria of one or more images and/or videos of a target user received from an AR device to one or more social network accounts. In some aspects, such other identifying criteria may comprise one or more of: a badge associated with a target user, an RFID computing device associated with a target user, a unique skin color associated with a target user, body measurements associated with a target user, and eye characteristics associated with a target user.

Upon determining that one or more images received from an AR device, and/or one or more values associated with those one or more images, meet a facial recognition identification threshold associated with a social network account profile, information from the matched social network account profile may be provided from the social network and/or the cloud-based facial recognition service to the AR computing device. The AR computing device may then display an augmentation of the live video stream comprising one or more elements of the received information from the matched social network account profile in association with a display area of the live video stream on the AR computing device in which a corresponding matched user is displayed (i.e., a live video stream of the target user). In some examples, the augmentation of the live video stream may comprise overlaying the live video feed of a matched user with corresponding content from their social network account, including: a name of the matched user, a geographic location of the matched user, a work title of the matched user, an employer of the matched user, education information of the matched user, an age of the matched user, a date of birth of the matched user, interests of the matched user, social network groups that the matched user is a member of, and/or other social network users that the matched user is connected to. In additional examples, the augmentation may comprise a hologram projection of information from a matched social network account in association with the display of one or more target users on a display of an AR device. As such, when an image of a user displayed on a live video stream of an AR device is matched to a social network account, information from a matched social network account may be displayed and/or projected in association with the corresponding matched user on the AR device's display of the live video stream.

In addition to augmenting a live video stream with information from a matched social network account, a live video stream may also be augmented with information from a variety of other sources. For example, the live video feed may be augmented with information from: calendar applications, messaging applications, video and photo applications, contact lists, as well as other content stored on, or in association with, one or more devices of a matched social network account user.

In some examples, if an image of a target user is matched to a social network account, a live video stream of the target user may be augmented with a display of recent or most relevant messages and/or communications that the AR device user has exchanged with the target user. That is, once a matching social network account has been identified, information from that account may be utilized to search messaging content associated with that user. The searched messaging content may be contained in one or more of a social network messaging store, an email application store, an SMS messaging store, etc., and that content may be searched and analyzed to determine whether the target user has exchanged one or more messages with the AR device user. One or more exchanged messages may thus be augmented with the live video stream on the AR device.

The live video stream on the AR device may also be augmented with one or more social network service actions that are capable of being executed based on identifying a facial match between one or more target users and their corresponding social network service accounts/profiles. For example, upon identifying a social network account/profile that matches one or more images received from the AR device, an option to create a group including the matched social network user and the AR device user may be presented on the AR device. In some examples, a proposed group name may be determined based on one or more shared interests associated with the matched social network account and a social network account of the AR device user. In other examples, a proposed group name may be determined based on one or more shared calendar entries associated with the matched social network account and a social network account of the AR device user. In still other examples, a proposed group name may be determined based on a geographic location corresponding to the location of the AR device. In additional examples, a proposed group name may be determined based on the content of one or more messages that have been exchanged between the matched user and the AR device user. In still other examples, a group name may be presented by an AR device upon an indication to do so by a user of the AR device. In some examples, the indication may comprise a speech command by a user of the AR device, a tactile input by a user of the AR device and/or a gesture input by the user of the AR device. According to some aspects, a user may modify a suggested group name presented on the AR device, by for example, executing a modification command. The modification command may be executed by, for example, a user of the AR device inputting a speech modification command, a tactile modification command and/or a gesture modification command.

According to some aspects, users of a social network service in association with facial recognition and augmented reality, may place qualifications regarding how much of their social network information is shared with AR services and in what circumstances to share such information about themselves with other users. For example, a user may be provided with social network account settings that they may utilize to select whether to share information from their social network account at all, what users to share certain account information with, what circumstances to share that account information, and what other applications or application resources may be accessed (e.g., messaging application stores, calendar applications, location information, etc.) according to the systems and methods described herein. Thus, users may implement social network privacy controls such that only certain connections (e.g., first level connections, second level connections, etc.) may view the full set or a subset of information from the user's social network account, and/or such that one or more circumstances must occur in order for that information to be shared (e.g., a user of the AR device and the target user must be employed by the same entity, a user of the AR device and the target user must be within a threshold geographic proximity of one another, etc.).

In additional examples, a target user or AR device user may apply privacy settings in association with a meeting or event. For example, users registering for a meeting or event may allow or disallow other attendees of the meeting or event to access information associated with a social network account that they are associated with, or they may create a unique meeting or event profile that may be accessed by other users and/or user computing devices that are present at the meeting or event. In some examples, a badge or RFID computing device associated with an attendee of an event or meeting may be provided to attendees upon registration to the event or meeting, and an AR device may receive identifying information from the badge or RFID computing device, which may be utilized in determining the identify of a target user when the AR device is in communication range of the badge or RFID computing device. In other examples, the AR device may match a unique identifier provided by the badge or RFID computing device to a social network or event/meeting database in determining the identify of one or more target users.

FIG. 1 is a schematic diagram illustrating an example distributed computing environment 100 for augmenting a live video feed on an augmented reality computing device, with social network account information of a target user. Distributed computing environment 100 includes non-augmented environment 102, network 104, social network and processing environment 106, and augmented reality environment 108.

Non-augmented environment 102 includes AR device user 110, AR computing device 112, first target user 114, and second target user 116. Social network and processing environment 106 includes social network store 118, and one or more computing devices, such as server computing device 120. Augmented reality environment 108 includes AR device user 122, AR computing device 128, first target user 124, and second target user 124. Any of the computing devices depicted in example distributed environment 100 may communicate with one another via network 104 via wired and/or wireless network communication resources comprising network 104. Although illustrated as a phone or tablet, AR computing devices 112 and 128 may comprise computer-integrated eyeglasses, a heads-up display device, or any other computing device having augmented reality capabilities.

AR device user 110 may utilize AR computing device 112 to take one or more videos and/or images of an environment they are interacting with. For example, AR device user 110 may direct a camera of AR computing device 112 in the direction of first target user 114 and second target user 116, and a live video stream of those users may be displayed on a display of AR computing device 112, as illustrated in non-augmented environment 102. In some examples, one or more images or videos from the live video stream may be sent from AR computing device 112, via network 104, to one or more computing devices associated with a social networking service. For example, one or more images or videos taken by AR computing device 112 of first target user 114 and second target user 116 may be sent, via network 104, to server computing device 120 in social network and processing environment 106, which may perform operations related to analyzing the images of first target user 114 and second target user 116, and determining whether a facial recognition match can be made between the images of one or both of those users and one or more social networking service accounts. That is, server computing device 120 may analyze one or more features of the received images or videos and determine one or more facial feature values for each of first target user 114 and second target user 116. Once the facial feature values have been determined, server computing device 120 may analyze one or more accounts of the social network service, stored in social network store 118, and determine whether one or more facial feature values corresponding to each of the target users meet an identification threshold value for determining that one or both of the target user's determined feature values match one or more facial feature values for a user of a social network account. That is, facial feature values for one or more social network accounts may be determined based on analysis performed by one or more computing devices in social network and processing environment 106, such as servicer computing device 120, of images or videos associated with those accounts, and the facial feature values determined for the target users may then be compared with the facial feature values determined from the social network accounts to determine whether they meet an identification threshold (e.g., a degree of statistical certainty that a target user matches an account of a social network service).

As described in the example above, AR computing device 112 may send one or more images or videos of persons to social network and processing environment 106 for processing of those images and/or videos into one or more facial feature values that can be matched against facial feature values for one or more social network service accounts. However, in some examples, AR computing device 112 may perform its own analysis of images and videos it takes of persons, and through that analysis generate facial feature values for those persons. As such, rather than sending full images and/or videos to social network and processing environment 106, AR computing device 112 may send the facial feature values it has determined based on its own analysis to social network and processing environment 106, which may then subsequently determine whether those values meet an identification threshold for a social network service account. In still other examples, AR computing device 112 may perform the match analysis itself. That is, AR computing device may independently communicate with social network store 118 and determine whether facial feature values it computes for one or more persons it has taken pictures or videos of meet an identification threshold for a social network service account.

Upon determining that facial feature values for one or both of target users 114 and 116 match one or more accounts of the social networking service, information associated with the matching social networking service accounts may be sent, via network 104, to AR computing device 128 in augmented reality environment 108. In this example, AR computing device 128 is the same device as AR computing device 112, and target users 124 and 126 in augmented reality environment 108 are the same target users as target users 114 and 116 in non-augmented reality environment 102.

The information associated with a matching social network service account may comprise one or more of a name of the social network service account holder, the current geographic location of the social network service account holder, the geographic location of the social network service account holder, a work title of the social network service account holder, an employer of the social network service account holder, education information of the social network service account holder, an age of the social network service account holder, a birthday of the social network service account holder, an interest of the social network service account holder, a group of the social network that the social network service account holder is associated with, and one or more other users of the social network that the social network service account holder is connected to via the social network service.

In some examples, in addition or alternative to providing one or more pieces information described above from a matched social network account to augmented reality environment 108, and specifically AR computing device 128, messaging content associated with messages exchanged between AR device user 122 and one or more of the target users 124 and 126 may be provided. For example, if a determination is made that a social network service account matches facial feature values for target user 124, one or more messaging stores may be analyzed and a determination may be made as to whether AR device user 122 has exchanged any messages with target user 124. In some examples, a messaging store from the social network service may be analyzed for this information. That is, social network store 118 may comprise a plurality of social networking service messages that target user 124 has sent or received from AR device user 122, and that information may be sent, via network 104, to AR computing device 128. In other examples, one or more messaging applications or messaging application stores that are not directly associated with the social networking service may analyzed to determine whether target user 124 has sent or received messages from AR device user 122. For example, email and/or SMS messaging applications or application stores for one or both of target user 124 and AR device user 122 may be queried to determine whether target user 124 and AR device user 122 have exchanged messages with one another. In some examples, a name, or other information associated with a matched social network service account for target user 124 may be used as a search query of one or more of the messaging applications or application stores, and exchanged messaging content may be identified based on that query.

Upon receiving information associated with a matched social network service account corresponding to one or both of target users 124 and 126, AR computing device 128 may augment its live video stream of the target users with one or more pieces of information. For example, AR computing device 128 may augment the display of target users 124 and 126 in the live video stream, with informational content such as the users' names, places of employment, work titles, and additional information as determined from the matched social network account profiles and/or messaging applications and stores as described above. In examples where AR user 122 has been determined to have exchanged one or more messages with one or both of target users 124 and 126, one or more of those message may be included in the augmentation of the live video stream as more fully described in relation to the description of FIG. 2 provided herein.

In additional examples, upon receiving information associated with a social network service account corresponding to one or both of target users 124 and 126, AR computing device 128 may augment its live video stream of the target users with at least one social networking action that can be executed on the social network service based on a matched identification of one or both of target users 124 and 126, as well as a social network service account associated with AR device user 122. In a specific example, the at least one executable social networking action may comprise an option to form a social network group on the social network service. That is, AR device 128 may present an executable option to AR device user 128, to create a social network group comprising AR device user 128 and one or more matched social network accounts corresponding to one or both of target users 124 and 126. In other examples, the at least one executable social networking option may comprise an option to send a message to a matched target user on the social network. For example, if a social network account has been matched to target user 124, an option may be provided to send a direct message to target user 124 via the social network. In other examples, if a social network account has been matched to target user 124, an option may be provided to send a direct message to target user 124 via one or more other messaging applications that are determined to be common amongst target user 124 and AR device user 128. Additionally or alternatively, AR device 128 may present (i.e., display in its live video stream) an executable option to AR device user 128, to send a matched target user (e.g., target user 124, target user 126), a connection request and/or a request to exchange information with one another, if the AR device user 128 and one or more matched target users are not already connected via the social network service.

Figure 2:
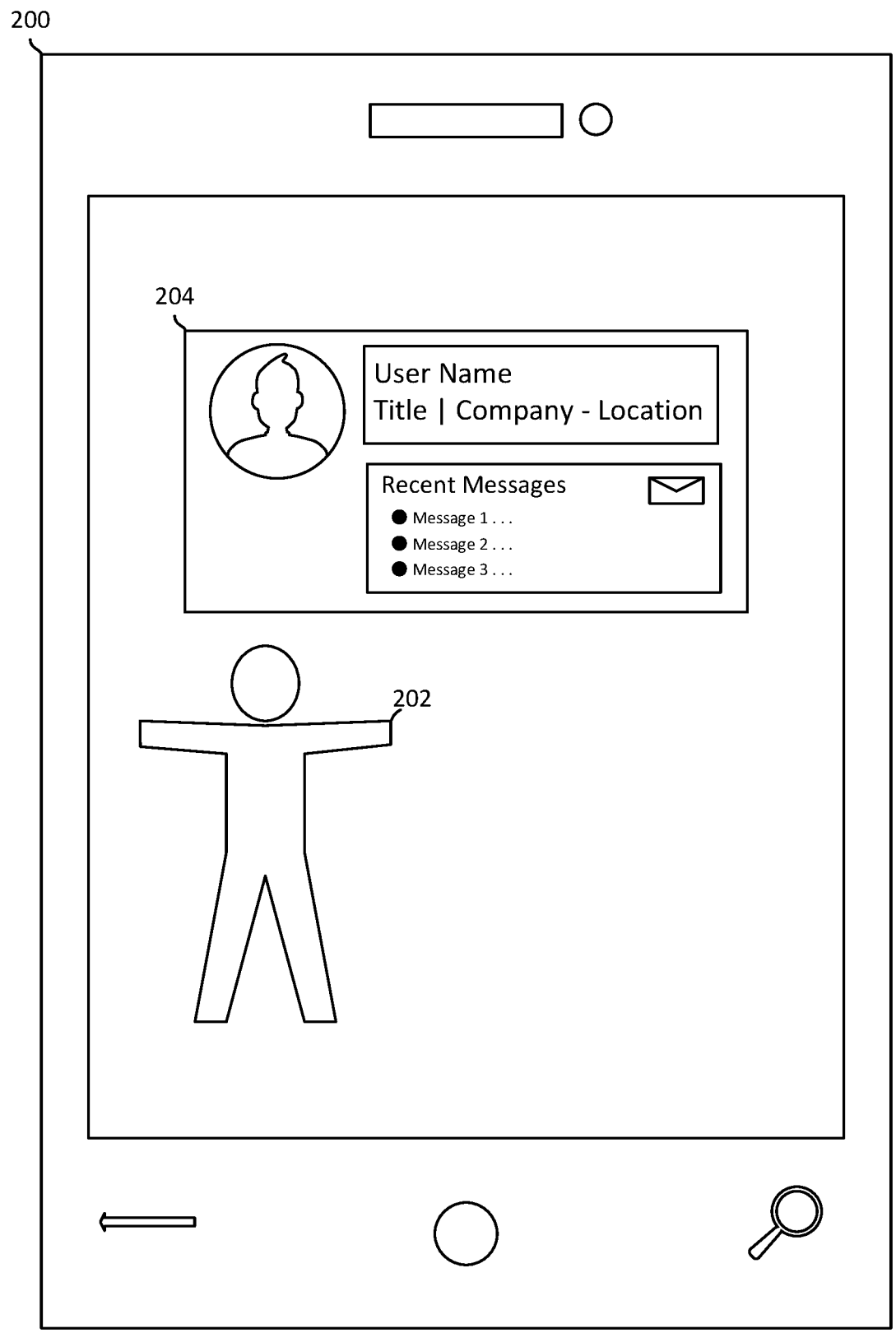
FIG. 2 illustrates an exemplary augmentation of a live video feed of a target user on an augmented reality computing device, with information from a corresponding matched social network account.

FIG. 2 illustrates an exemplary augmentation 204 of a live video feed of a target user 202 on an AR computing device 200, with information from a corresponding matched social network account. Although the AR computing device 200 is depicted as a smart phone or tablet in FIG. 2, it should be understood that any computing device capable of producing an augmented reality video stream may be utilized to implement aspects of the invention as described herein.

Thus, FIG. 2 illustrates an augmentation 204 of a target user 202 for whom it has been determined that a match exists for a social network service account. That is, a determination has been made, based on one or more images or videos taken of target user 202 by AR computing device 200, or a related camera device, that one or more facial feature values of target user 202 meet a threshold value for matching target user 202 to a social network account of a specific social network account holder based on one or more images or videos associated with that account.

The augmentation 204 may include information received directly from the social network service about target user 202, as well as information that may have been determined from one or more other applications, services and/or stores, based on information received from social network service about user 202. For example, augmentation 204 for target user 202 includes a profile picture or profile video of target user 204, target user 204's name and/or alias, target user 204's title (e.g., a work title, a description of user 204, etc.), the name of a company that target user 204 works for, and a home or residency location for target user 204, all of which may be received directly from the matched social network account for target user 204.

Augmentation 204 also includes recent messages that have been exchanged between target user 202 and a user associated with the AR computing device 200 (e.g., a user that is currently using AR device 200, a user who is signed on to AR computing device 200, a user associated with an AR application being implemented on AR computing device 200, etc.). In some examples, the most recent messages augmentation may comprise N number of most recent messages exchanged between target user 202 and a user associated with the AR computing device 200 on a messaging application of the social network service. In other examples, the most recent messages augmentation may comprise N number of most recent messages exchanged between target user 202 and a user associated with the AR computing device 200 on a messaging application that is not directly associated with the social network service (e.g., an email application, SMS messaging applications, etc.). In still other examples, the most recent messages augmentation may comprise N number of most recent messages exchanged between target user 202 and a user associated with the AR computing device 200 on a messaging application of the social network service and one or more messaging applications that are not directly associated with the social network service.

According to some aspects, in addition or alternative to augmenting the live video stream of target user 202 with N number of most recent messages, the messages augmentation may comprise displaying N number of most relevant messages exchanged between target user 202 and a user associated with the AR computing device 200, as determined based on one or more relevance features. Relevance features may include, for example, which messaging application a message was derived from, whether the target user 202 or the user associated with the AR computing device 200 were senders or direct recipients of a message, whether the user associated with the AR computing device 200 were CCed on a message, a number of other recipients on a message in addition to the target user 202 and/or the user associated with the AR computing device 200, an amount of engagement that the target user 202 and/or the user associated with the AR computing device 200 spent looking or otherwise interacting with a message, the length of a message, the content of a message, how recently a message was sent, how recently a message was viewed, and how recently someone replied to a message. One or more of the relevance features may be used in determining which N number of messages to surface on the messages augmentation for target user 202, as well as in what order to display those N number of messages on the messages augmentation. Additionally, each of the relevance features may have a different weight assigned to it, such that each relevance feature may have a different maximum and minimum value applied to it in determining the relevance of a particular message.

Figure 3:
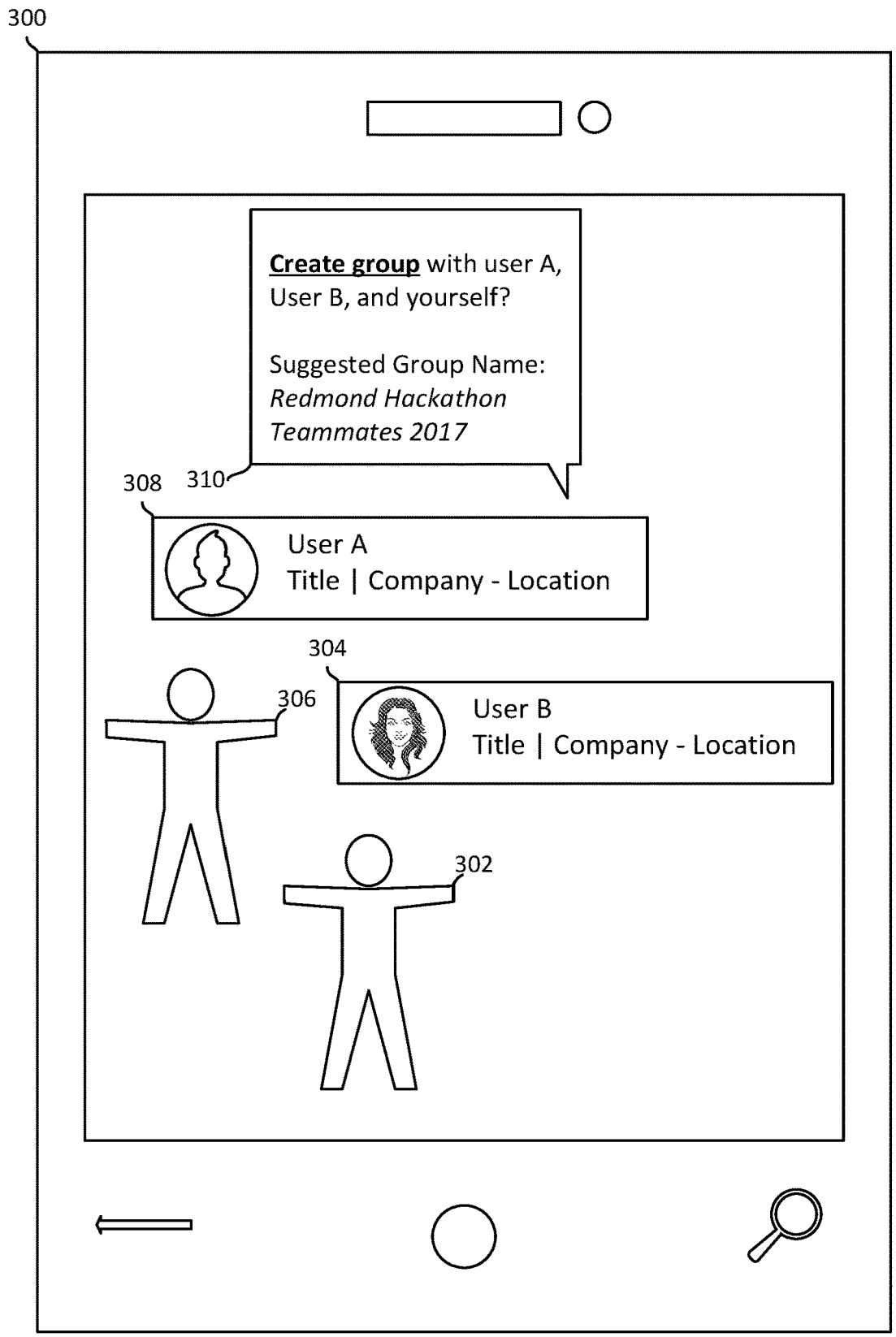
FIG. 3 illustrates an exemplary augmentation of a live video feed of two target users on an augmented reality computing device, with information from two corresponding matched social network accounts.

FIG. 3 illustrates exemplary augmentations for a first target user 302 and a second target user 308 on an augmented reality computing device 300. Although the AR computing device 300 is depicted as a smart phone or tablet in FIG. 3, it should be understood that any computing device capable of producing an augmented reality video stream may be utilized to implement aspects of the invention as described herein.

The live video stream comprises a display of target users 302 and 306 on AR computing device 300. The augmentation of the live video stream on the display of AR computing device 300 comprises information associated with matched social network accounts for target users 302 and 306. For example, the information from the matched social network account for target user 302 is provided in augmentation 304, which comprises target user 302's profile picture or profile video, name, title, company, and location, and the information from the matched social network account for target user 306 is provided in augmentation 308, which comprises target user 306's profile picture or profile video, name, title, company, and location. One or both of augmentations 304 and 306 may additionally or alternatively comprise a plurality of most recent or most relevant exchanged messages with a user associated with the AR computing device 300.

In addition to augmentations 304 and 308, the live video stream displayed on AR computing device 300 also includes executable social network augmentation 310. Executable social network augmentation 310 provides a user associated with the AR computing device 300 with an option to create a social network group including target user 302, target user 306, and the user associated with the AR computing device 300. According to some aspects, executable social network augmentation 310 may also include a suggested group name for the proposed social network group. Thus, in this example, executable social network augmentation 310 provides suggested group name: "Redmond Hackathon Teammates 2017" in association with the executable option to create the social network group.

Suggestions for social network group names may be determined based on one or more information sources. Exemplary information sources for suggested social network group names may comprise calendar entry content from calendar applications of target users and users associated with the AR computing device 300, current geographic locational data obtained from one or more client devices associated with target users and users associated with the AR computing device 300, joint interests of target users and users associated with the AR computing device 300 determined from their matched social network accounts, and the content of messages exchanged amongst one or more target users and users associated with the AR computing device 300, among others. For example, upon matching each of target user 302 and target user 306 to social network accounts based on facial recognition matching as described herein, calendar entries associated with the target users, as well as the user associated with the AR computing device, may be analyzed, and a determination may be made that each of the users has a calendar entry for the date and time of the live video stream on the AR computing device that relates to "Redmond Hackathon 2017". Likewise, a determination may be made, based on messages exchanged between each of the users (e.g., target users 302 and 306, and the user associated with the AR computing device), that those users are all part of the same team for the Redmond Hackathon, and the name "Redmond Hackathon Teammates 2017" may thus be suggested in association with executable social network augmentation 310.

Figure 4:
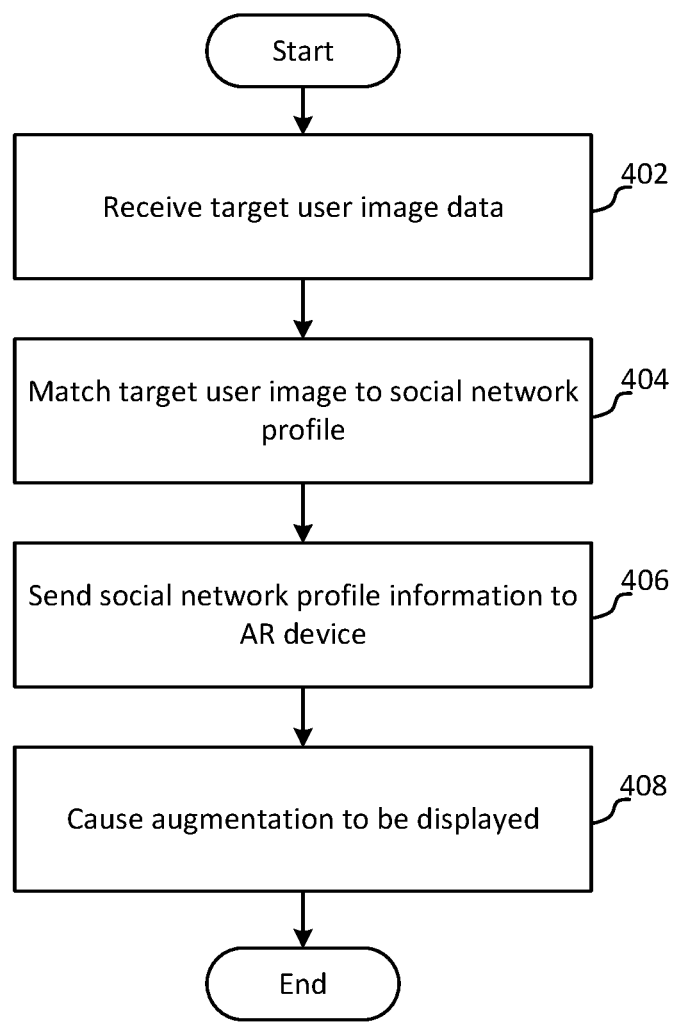
FIG. 4 is an exemplary method 400 for matching target user image data to a social network account, and causing an augmentation comprising that data and the target user to be displayed in a live video stream.

FIG. 4 is an exemplary method 400 for matching target user image data to a social network account, and causing an augmentation comprising information associated with the social network account and the target user to be displayed in a live video stream. The method 400 begins at a start operation and flow continues to operation 402, where one or more images, videos, or data associated with the one or more images and/or videos of a target user are received by a social network service from a live stream of an AR computing device. In examples, rather than an entire image or video files being received from the AR computing device, the AR computing device may perform facial feature value analysis of target user images and videos and send its own value attributions for a target user to the social network service.

From operation 402 flow continues to operation 404 where the target user image, video, or facial feature value data for the target user is matched against one or more social network accounts for which facial feature values have been determined based on profile images of corresponding users. In examples, facial feature values may be determined by a social network service for each social network account that it has been granted permission by its users to access the corresponding necessary information. For example, if a social network account user has granted permission for the social network service to provide facial feature recognition information to one or more AR services, the social network may analyze one or more images and/or videos of the user from their social network profile, and determine one or more baseline facial feature values that may be used to determine whether the user associated with the account matches one or more facial feature values from uploaded images, videos, and or corresponding data received from AR services. In examples, for a determination to be made that a match exists between images or videos uploaded from an AR computing device and a corresponding social network account, one or more facial features uploaded from AR computing device content must meet a threshold identification value in relation to facial feature values determined for a social network account. The threshold identification value may comprise a statistical probability that a person corresponding to the uploaded images or video from the AR computing device correspond to a social network account user.

From operation 404 flow continues to operation 406 where social network profile information is send to an AR computing device based on one or more facial feature values for an uploaded image or video received from an AR computing device matching one or more facial feature values from a social network service account. That is, when a determination is made that uploaded images or videos of a user from an AR computing device match a social network account, the social network service may send information from the matched social network account to the AR computing device. The information may comprise one or more of a name of the user associated with the social network account, a geographic location of the user associated with the social network account, a work title of the user associated with the social network account, an employer of the user associated with the social network account, education information of the user associated with the social network account, an age of the user associated with the social network account, a birthday of the user associated with the social network account, an interest of the user associated with the social network account, a group of the social network that the user associated with the social network account is a member of, and/or one or more users of the social network that the user associated with the social network account is connected to via the social network. In additional aspects, the social network service may send the name or other identifying information associated with a matched social network account to a third-party service such as an email service, a calendar service, and a messaging service, and the name or other identifying information may be utilized in determining additional information from those services that may be sent to the AR computing device for augmenting a live video feed associated with one or more target users.

From operation 406 flow continues to operation 408 where an augmentation of a live video feed is caused to be displayed on an AR computing device that sent one or more images or videos to the social networking service for matching. For example, the social network service may determine one or more specific portions of information from one or more matched social network accounts to overlay onto a live video stream of one or more target users on an AR computing device. In examples, the information to provide as an augmentation to the AR computing device may be determined based on an AR computing device user's settings, the capabilities of a particular AR computing device, privacy settings of users associated with matched social network accounts, the amount of information provided in matched social network accounts, the amount of space available on a display of an AR computing device where the information is to be caused to be displayed, etc.

From operation 408 flow continues to an end operation, and the method 400 ends.

Figure 5:
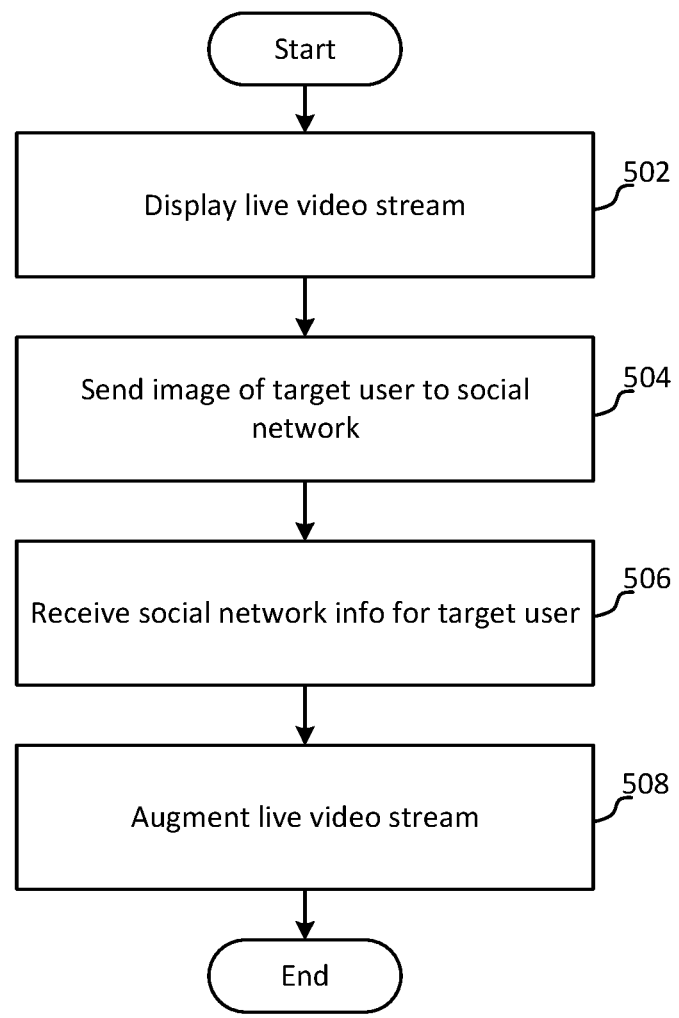
FIG. 5 is an exemplary method 500 for augmenting a live video feed on an augmented reality computing device, with social network account information of a target user.

FIG. 5 is an exemplary method 500 for augmenting a live video feed on an augmented reality computing device, with social network account information of a target user. The method 500 begins at a start operation and continues to operation 502 where an AR computing device displays a live video stream. In examples, the AR computing device may comprise a smart phone, a tablet, smart eyeglasses, etc. The AR computing device may include one or more AR applications for generating augmentations on live video streams related to identifying users based on live images and/or videos taken by the AR computing device and matching those live images and/or videos to one or more accounts of a social networking service. In examples, the live video stream may comprise a display of one or more target users on the AR computing device.

From operation 502 flow continues to operation 504 where one or more images and/or videos and/or data associated with those one or more images and/or videos are sent to a social network service for a determination of whether one or more social network accounts match a target user associated with uploaded content from the AR computing device. From operation 504 flow continues to operation 506.

At operation 506 information associated with one or more social network accounts that have been determined to match uploaded content from a live video stream of an AR computing device of one or more target users is received by the AR computing device. In examples, the received information may include data related to a matched social media account, including one or more of a name of a user associated with a matched social network account, a geographic location of a user associated with a matched social network account, a work title of a user associated with a matched social network account, an employer of a user associated with a matched social network account, education information associated with a matched social network account, an age of a user associated with a matched social network account, a birthday of a user associated with a matched social network account, an interest of a user associated with a matched social network account, a group of the social network that a user associated with a matched social network account is a member of, and/or one or more users of the social network that a user of a matched social network account is connected to via the social network. In additional aspects, the social network service may send the name or other identifying information associated with a matched social network account to a third-party service such as an email service, a calendar service, and a messaging service, and the name or other identifying information may be utilized in determining additional information from those services that may be sent to the AR computing device for augmenting a live video feed associated with one or more target users.

From operation 506 flow continues to operation 508 a live video stream comprising one or more target users is augmented with information received from the social network service and/or information received from one or more third-party services based on information received from a matched social network account of the social network service. In examples, the augmentation may comprise displaying the name or other information from a matched social network account in locational proximity to a display of a target user in a live video feed on an AR computing device. In additional examples, the augmentation may comprise displaying one or more most recent or most relevant messages exchanged between a target user and a user associated with the AR computing device on a live video feed of the AR computing device. In still other examples, the augmentation may comprise displaying an executable option to perform one or more actions associated with the social network based on information associated with a matched user of the social network service and a user associated with the AR computing device. In some aspects, the augmentation may comprise an executable option to create a social network group comprising one or more matched target users and a user associated with the AR computing device. An executable option to create a group may comprise a suggested name for the social network service group, which may be determined based on information received from one or more matched social network accounts corresponding to target users, and/or information obtained from one or more third-party services, such as email services, messaging services, geolocation services, and calendar services based at least in part on identifying information obtained from matched social network accounts.

From operation 508 flow continues to an end operation and the method 500 ends.

Figure 6:
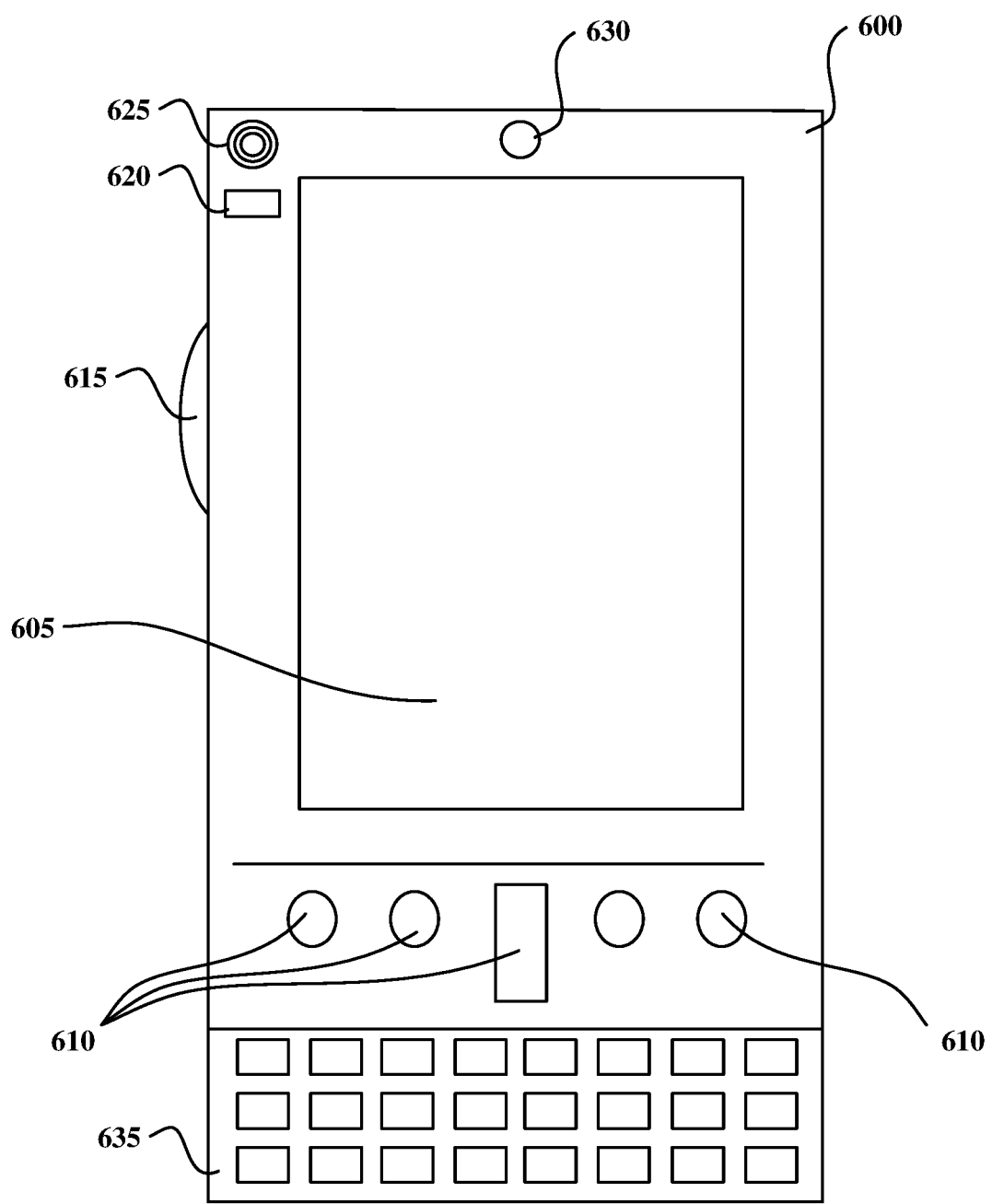
FIGS. 6 and 7 are simplified diagrams of a mobile computing device with which aspects of the disclosure may be practiced.
Figure 7:
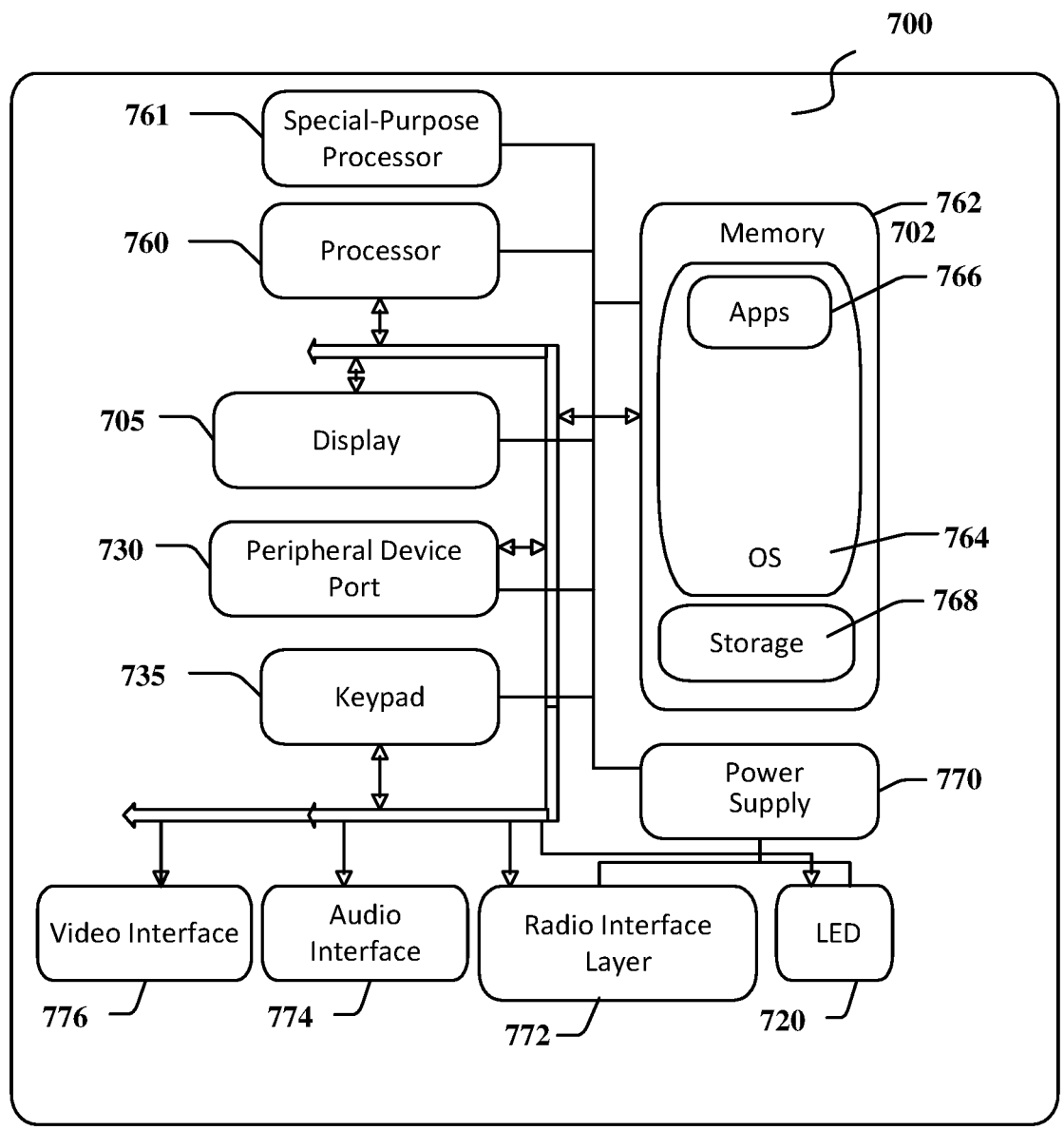

FIGS. 6 and 7 illustrate a mobile computing device 600, for example, a mobile telephone, a smart phone, wearable computer (such as smart eyeglasses), a tablet computer, an e-reader, a laptop computer, or other AR compatible computing device, with which embodiments of the disclosure may be practiced. With reference to FIG. 6, one aspect of a mobile computing device 600 for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. The display 605 of the mobile computing device 600 may also function as an input device (e.g., a touch screen display). If included, an optional side input element 615 allows further user input. The side input element 615 may be a rotary switch, a button, or any other type of manual input element. In alternative aspects, mobile computing device 600 may incorporate more or fewer input elements. For example, the display 605 may not be a touch screen in some embodiments. In yet another alternative embodiment, the mobile computing device 600 is a portable phone system, such as a cellular phone. The mobile computing device 600 may also include an optional keypad 635. Optional keypad 635 may be a physical keypad or a "soft" keypad generated on the touch screen display. In various embodiments, the output elements include the display 605 for showing a graphical user interface (GUI), a visual indicator 620 (e.g., a light emitting diode), and/or an audio transducer 625 (e.g., a speaker). In some aspects, the mobile computing device 600 incorporates a vibration transducer for providing the user with tactile feedback. In yet another aspect, the mobile computing device 600 incorporates input and/or output ports, such as an audio input (e.g., a microphone jack), an audio output (e.g., a headphone jack), and a video output (e.g., a HDMI port) for sending signals to or receiving signals from an external device.

FIG. 7 is a block diagram illustrating the architecture of one aspect of a mobile computing device. That is, the mobile computing device 700 can incorporate a system (e.g., an architecture) 702 to implement some aspects. In one embodiment, the system 702 is implemented as a "smart phone" capable of running one or more applications (e.g., browser, e-mail, calendaring, contact managers, messaging clients, games, and media clients/players). In some aspects, the system 702 is integrated as a computing device, such as an integrated personal digital assistant (PDA) and wireless phone.

One or more application programs 766 may be loaded into the memory 762 and run on or in association with the operating system 864. Examples of the application programs include phone dialer programs, e-mail programs, personal information management (PIM) programs, word processing programs, spreadsheet programs, Internet browser programs, messaging programs, and so forth. The system 702 also includes a non-volatile storage area 768 within the memory 762. The non-volatile storage area 768 may be used to store persistent information that should not be lost if the system 702 is powered down. The application programs 766 may use and store information in the non-volatile storage area 768, such as e-mail or other messages used by an e-mail application, and the like. A synchronization application (not shown) also resides on the system 702 and is programmed to interact with a corresponding synchronization application resident on a host computer to keep the information stored in the non-volatile storage area 768 synchronized with corresponding information stored at the host computer. As should be appreciated, other applications may be loaded into the memory 762 and run on the mobile computing device 700, including instructions for providing and operating an augmented reality computing platform.

The system 702 has a power supply 770, which may be implemented as one or more batteries. The power supply 770 might further include an external power source, such as an AC adapter or a powered docking cradle that supplements or recharges the batteries.

The system 702 may also include a radio interface layer 772 that performs the function of transmitting and receiving radio frequency communications. The radio interface layer 772 facilitates wireless connectivity between the system 702 and the "outside world," via a communications carrier or service provider. Transmissions to and from the radio interface layer 772 are conducted under control of the operating system 764. In other words, communications received by the radio interface layer 772 may be disseminated to the application programs 766 via the operating system 764, and vice versa.

The visual indicator 620 may be used to provide visual notifications, and/or an audio interface 774 may be used for producing audible notifications via the audio transducer 625. In the illustrated embodiment, the visual indicator 620 is a light emitting diode (LED) and the audio transducer 625 is a speaker. These devices may be directly coupled to the power supply 770 so that when activated, they remain on for a duration dictated by the notification mechanism even though the processor 760 and other components might shut down for conserving battery power. The LED may be programmed to remain on indefinitely until the user takes action to indicate the powered-on status of the device. The audio interface 774 is used to provide audible signals to and receive audible signals from the user. For example, in addition to being coupled to the audio transducer 625, the audio interface 774 may also be coupled to a microphone to receive audible input, such as to facilitate a telephone conversation. In accordance with embodiments of the present disclosure, the microphone may also serve as an audio sensor to facilitate control of notifications, as will be described below. The system 702 may further include a video interface 776 that enables an operation of an on-board camera 630 to record still images, video stream, and the like.

A mobile computing device 700 implementing the system 702 may have additional features or functionality. For example, the mobile computing device 700 may also include additional data storage devices (removable and/or non-removable) such as, magnetic disks, optical disks, or tape. Such additional storage is illustrated in FIG. 7 by the non-volatile storage area 768.

Data/information generated or captured by the mobile computing device 700 and stored via the system 702 may be stored locally on the mobile computing device 700, as described above, or the data may be stored on any number of storage media that may be accessed by the device via the radio interface layer 772 or via a wired connection between the mobile computing device 700 and a separate computing device associated with the mobile computing device 700, for example, a server computer in a distributed computing network, such as the Internet. As should be appreciated such data/information may be accessed via the mobile computing device 700 via the radio interface layer 772 or via a distributed computing network. Similarly, such data/information may be readily transferred between computing devices for storage and use according to well-known data/information transfer and storage means, including electronic mail and collaborative data/information sharing systems.

Figure 8:
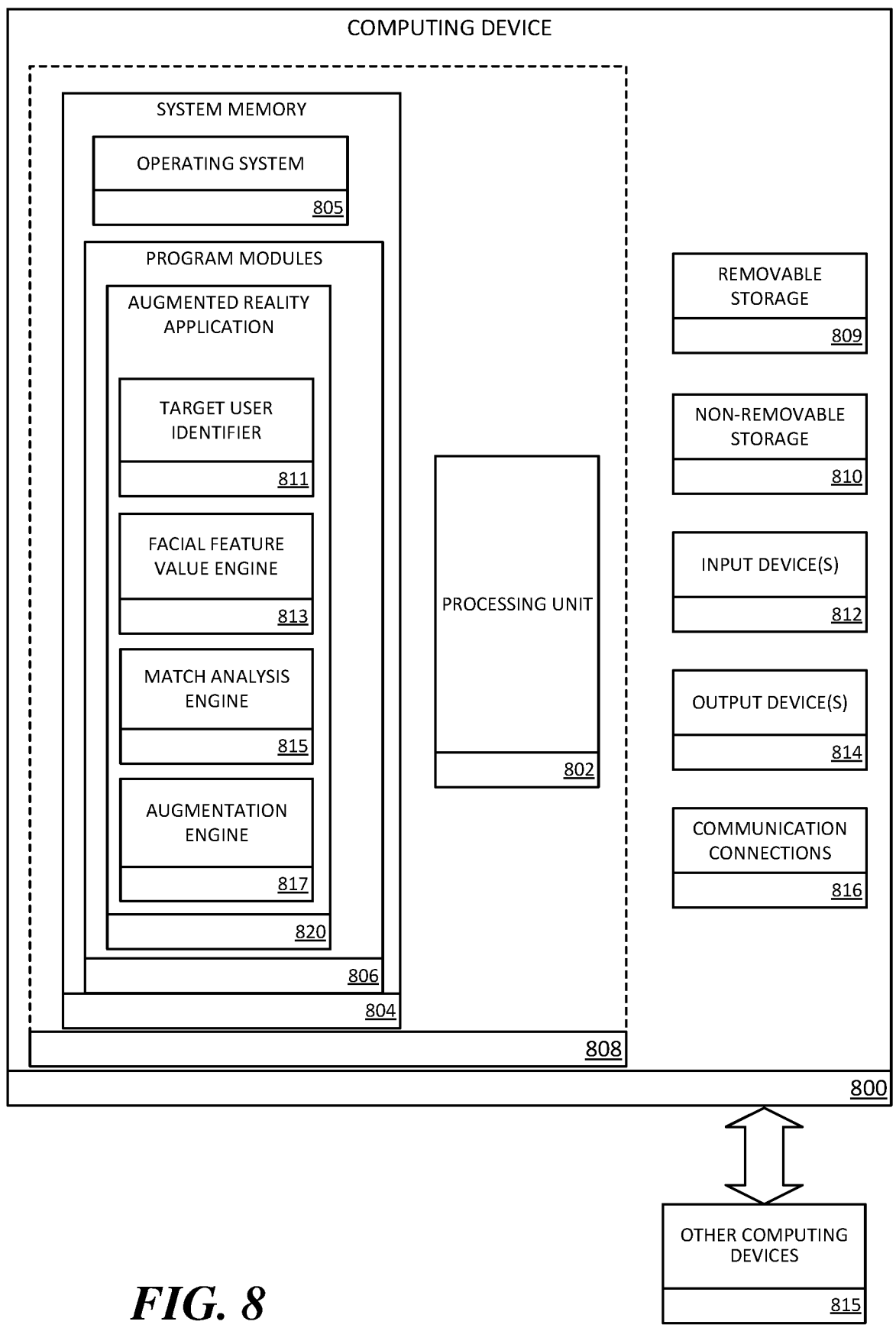
FIG. 8 is a block diagram illustrating example physical components of a computing device with which aspects of the disclosure may be practiced.

FIG. 8 is a block diagram illustrating physical components (e.g., hardware) of a computing device 800 with which aspects of the disclosure may be practiced. The computing device components described below may have computer executable instructions for matching target users to social network accounts and providing augmentations to AR computing devices. In a basic configuration, the computing device 800 may include at least one processing unit 802 and a system memory 804. Depending on the configuration and type of computing device, the system memory 804 may comprise, but is not limited to, volatile storage (e.g., random access memory), non-volatile storage (e.g., read-only memory), flash memory, or any combination of such memories. The system memory 804 may include an operating system 805 suitable for running one or more tree ensemble model optimization programs. The operating system 805, for example, may be suitable for controlling the operation of the computing device 800. Furthermore, embodiments of the disclosure may be practiced in conjunction with a graphics library, other operating systems, or any other application program and is not limited to any particular application or system. This basic configuration is illustrated in FIG. 8 by those components within a dashed line 808. The computing device 800 may have additional features or functionality. For example, the computing device 800 may also include additional data storage devices (removable and/or non-removable) such as, for example, magnetic disks, optical disks, or tape. Such additional storage is illustrated in FIG. 8 by a removable storage device 809 and a non-removable storage device 810.

As stated above, a number of program modules and data files may be stored in the system memory 804. While executing on the processing unit 802, the program modules 806 (e.g., augmented reality application 820) may perform processes including, but not limited to, the aspects, as described herein. According to examples, the target user identifier 811 may perform operations associated with detecting that an image or video on a live video stream on an AR computing device should be uploaded to a social networking service for match analysis. The facial feature value engine 813 may perform operations associated with assigning facial feature values to images and videos uploaded from an AR computing device. The match analysis engine 815 may perform operations associated with matching facial feature values uploaded from an AR computing device to facial feature values determined from social network accounts. The augmentation engine 817 may perform operations associated with augmenting a live video stream of one or more target users with information from one or more matched social network accounts and/or third-party service such as email services, SMS messaging services, photo services, calendar services, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 800 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 800 may also have one or more input device(s) 812 such as a keyboard, a mouse, a pen, a sound or voice input device, a touch or swipe input device, etc. The output device(s) 814 such as a display, speakers, a printer, etc. may also be included. The aforementioned devices are examples and others may be used. The computing device 800 may include one or more communication connections 816 allowing communications with other computing devices 850. Examples of suitable communication connections 816 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 804, the removable storage device 809, and the non-removable storage device 810 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 800. Any such computer storage media may be part of the computing device 800. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 9:
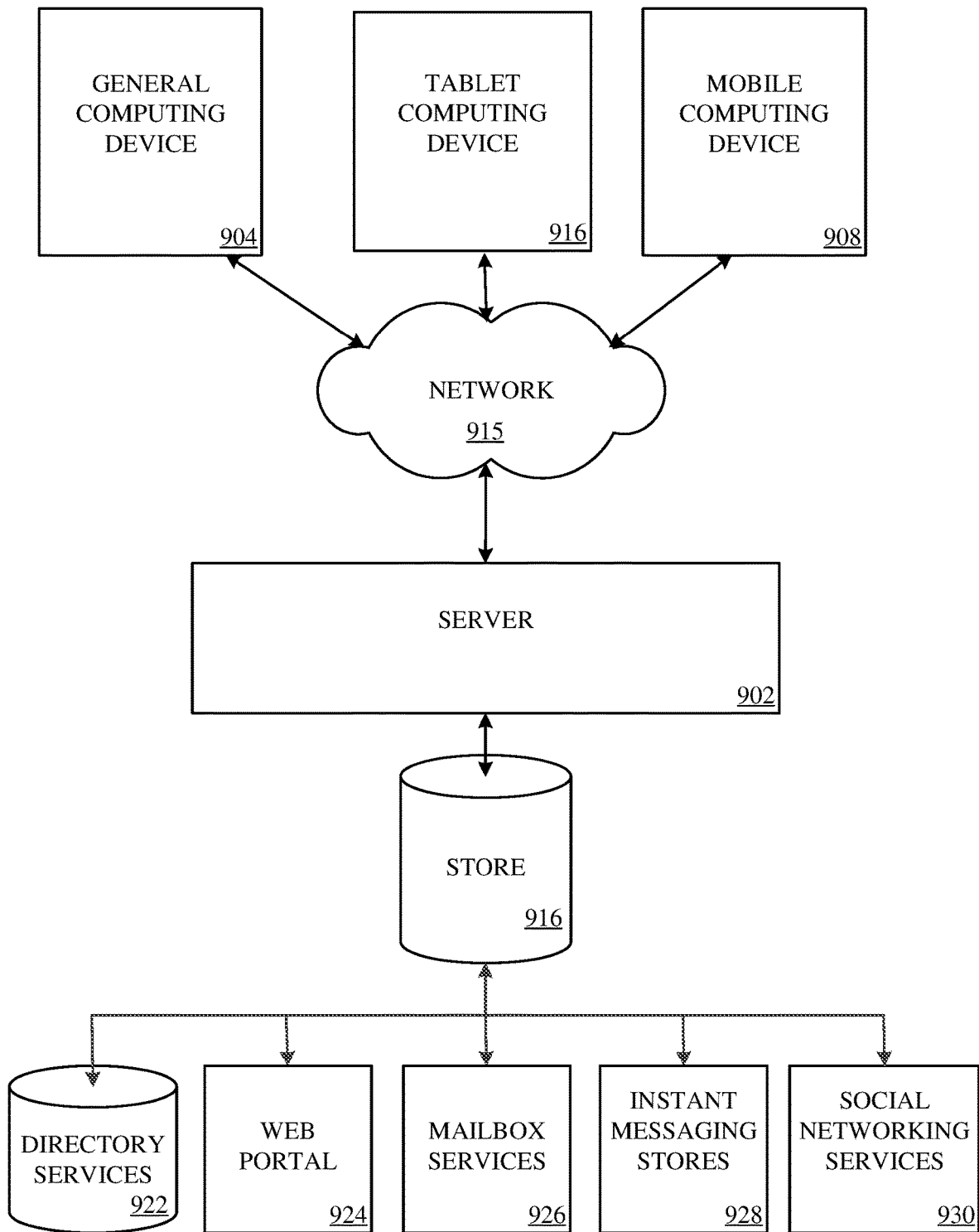
FIG. 9 is a simplified block diagram of a distributed computing system in which aspects of the present disclosure may be practiced.

FIG. 9 illustrates one aspect of the architecture of a system for processing data received at a computing system from a remote source, such as a personal/general computer 904, tablet computing device 906, or mobile computing device 908, as described above. Content displayed at server device 902 may be stored in different communication channels or other storage types. For example, various documents may be stored using a directory service 922, a web portal 924, a mailbox service 926, an instant messaging store 928, or a social networking site 930. The program modules 806 may be employed by a client that communicates with server device 902, and/or the program modules 806 may be employed by server device 902. The server device 902 may provide data to and from a client computing device such as a personal/general computer 904, a tablet computing device 906 and/or a mobile computing device 908 (e.g., a smart phone) through a network 915. By way of example, the computer system described above with respect to FIGS. 6-8 may be embodied in a personal/general computer 904, a tablet computing device 906 and/or a mobile computing device 908 (e.g., a smart phone). Any of these embodiments of the computing devices may obtain content from the store 916, in addition to receiving graphical data useable to be either pre-processed at a graphic-originating system, or post-processed at a receiving computing system.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present disclosure, one skilled in the art may envision variations, modifications, and alternate aspects falling within the spirit of the broader aspects of the general inventive concept embodied in this application that do not depart from the broader scope of the claimed disclosure.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A device comprising:
a processor; and
a memory in communication with the processor, the memory comprising executable instructions that, when executed by the processor, cause the processor to control the device to perform functions of:
receiving, from a remote device via a communication network, first facial feature data including a first facial feature of a first person, the remote device comprising a display and configured to capture a first image of the first person, generate a live video stream based on the captured first image of the first person and display the live video stream via the display;
identifying, from a plurality of social network user profiles, a first social network user profile corresponding to the received first facial feature data;
sending, to the remote device via the communication network, information associated with the first social network user profile; and
causing the remote device to augment the live video stream to display the information associated with the first social network user profile.

2. The device of claim 1, wherein, for receiving the first facial feature data, the instructions, when executed by the processor, further cause the processor to control the device to perform a function of receiving, from the remote device via the communication network, the first image of the first person captured by the remote device.

3. The device of claim 2, wherein, for identifying the first social network user profile corresponding to the first facial feature data, the instructions, when executed by the processor, further cause the processor to control the device to perform functions of:
identifying, based on the first image of the first person received from the remote device, a facial characteristic of the first person;
determining, based on the identified facial characteristic of the first person, a first facial identification value associated with the facial characteristic of the first person; and
determining that the facial identification value is within an identification threshold value of an image associated with the first social network user profile.

4. The device of claim 1, wherein the information associated with the first social network user profile comprises:
a name associated with the first social network user profile; and
at least one of a geographic location associated with the first social network user profile, a work title of the first social network user profile, an employer of the first social network user profile, education information of the first social network user profile, an age of the first social network user profile, an interest of the first social network user profile, a social network group with which the first social network user profile is associated, and another social network user profile to which the first social network user profile is connected.

5. The device of claim 4, wherein the instructions, when executed by the processor, further cause the processor to control the device to perform functions of:
receiving, from the remote device via the communication network, second facial feature data including a second facial feature of a second person, the remote device configured to capture a second image of the second person and generate the live video stream based on the captured first and second images of the first and second persons;
identifying, from the plurality of social network user profiles, a second social network user profile corresponding to the received second facial feature data;
sending, to the remote device via the communication network, information associated with the second social network user profile; and
causing the remote device to further augment the live video stream to display a social networking action involving the first and second persons.

6. The device of claim 5, wherein the social networking action comprises forming a social network group comprising the first person, the second person and a third person associated with the remote device.

7. The device of claim 6, wherein the instructions, when executed by the processor, further cause the processor to control the device to perform functions of:

identifying, based on the information associated with the first and second social network user profiles and information associated with a third social network user profile associated with the third person, a shared interest of the first, second and third persons;

determining, based on the shared interest of the first, second and third persons, a proposed name for the social network group; and causing the remote device to further augment the live video stream to display the proposed name for the social network group.

8. The device of claim 5, wherein, for causing the remote device to further augment the live video stream, the instructions, when executed by the processor, further cause the processor to control the device to perform functions of:

identifying, based on the information associated with the first and second social network user profiles and information associated with a third social network user profile associated with the third person, a shared interest of the first, second and third persons; and causing the remote device to further augment the live video stream to display a social network action for creating a social network group related to the shared interest of the first, second and third social network user profiles.

9. A method of operating a device for causing a remote device to display an augmented live video stream, the method comprising:

receiving, from a remote device via a communication network, first facial feature data including a first facial feature of a first person, the remote device comprising a display and configured to capture a first image of the first person, generate a live video stream based on the captured first image of the first person and display the live video stream via the display;

identifying, from a plurality of social network user profiles, a first social network user profile corresponding to the received first facial feature data;

sending, to the remote device via the communication network, information associated with the first social network user profile; and causing the remote device to augment the live video stream to display the information associated with the first social network user profile.

10. The method of claim 9, wherein receiving the first facial feature data comprising receiving, from the remote device via the communication network, the first image of the first person captured by the remote device.

11. The method of claim 10, wherein identifying the first social network user profile corresponding to the first facial feature data comprises:

identifying, based on the first image of the first person received from the remote device, a facial characteristic of the first person;

determining, based on the identified facial characteristic of the first person, a first facial identification value associated with the facial characteristic of the first person; and determining that the facial identification value is within an identification threshold value of an image associated with the first social network user profile.

12. The method of claim 9, wherein the information associated with the first social network user profile comprises:

a name associated with the first social network user profile; and at least one of a geographic location associated with the first social network user profile, a work title of the first social network user profile, an employer of the first social network user profile, education information of the first social network user profile, an age of the first social network user profile, an interest of the first social network user profile, a social network group with which the first social network user profile is associated, and another social network user profile to which the first social network user profile is connected.

13. The method of claim 9, further comprising:

receiving, from the remote device via the communication network, second facial feature data including a second facial feature of a second person, the remote device configured to capture a second image of the second person and generate the live video stream based on the captured first and second images of the first and second persons;

identifying, from the plurality of social network user profiles, a second social network user profile corresponding to the received second facial feature data;

sending, to the remote device via the communication network, information associated with the second social network user profile; and causing the remote device to further augment the live video stream to display a social networking action involving the first and second persons.

14. The method of claim 13, wherein the social networking action comprises forming a social network group comprising the first person, the second person and a third person associated with the remote device.

15. The method of claim 14, further comprising:

identifying, based on the information associated with the first and second social network user profiles and information associated with a third social network user profile associated with the third person, a shared interest of the first, second and third persons;

determining, based on the shared interest of the first, second and third persons, a proposed name for the social network group; and causing the remote device to further augment the live video stream to display the proposed name for the social network group.

16. The method of claim 13, wherein causing the remote device to further augment the live video stream comprises:

identifying, based on the information associated with the first and second social network user profiles and information associated with a third social network user profile associated with the third person, a shared interest of the first, second and third persons; and causing the remote device to further augment the live video stream to display a social network action for creating a social network group related to the shared interest of the first, second and third social network user profiles.

17. A non-transitory computer readable medium containing instructions which, when executed by a processor, cause a device to perform functions of:

receiving, from a remote device via a communication network, first facial feature data including a first facial feature of a first person, the remote device comprising a display and configured to capture a first image of the first person, generate a live video stream based on the captured first image of the first person and display the live video stream via the display;

identifying, from a plurality of social network user profiles, a first social network user profile corresponding to the received first facial feature data;

sending, to the remote device via the communication network, information associated with the first social network user profile; and causing the remote device to augment the live video stream to display the information associated with the first social network user profile.

18. The non-transitory computer readable medium of claim 17, wherein the instructions, when executed by the processor, further cause the processor to control the device to perform functions of:

receiving, from the remote device via the communication network, second facial feature data including a second facial feature of a second person, the remote device configured to capture a second image of the second person and generate the live video stream based on the captured first and second images of the first and second persons;

identifying, from the plurality of social network user profiles, a second social network user profile corresponding to the received second facial feature data;

sending, to the remote device via the communication network, information associated with the second social network user profile; and causing the remote device to further augment the live video stream to display a social networking action involving the first and second persons.

19. The non-transitory computer readable medium of claim 18, wherein the social networking action comprises forming a social network group comprising the first person, the second person and a third person associated with the remote device.

20. The non-transitory computer readable medium of claim 19, wherein the instructions, when executed by the processor, further cause the processor to control the device to perform functions of:

identifying, based on the information associated with the first and second social network user profiles and information associated with a third social network user profile associated with the third person, a shared interest of the first, second and third persons;

determining, based on the shared interest of the first, second and third persons, a proposed name for the social network group; and causing the remote device to further augment the live video stream to display the proposed name for the social network group.

* * * * *